United States Patent
Tlauka et al.

(10) Patent No.: US 11,912,218 B2
(45) Date of Patent: Feb. 27, 2024

(54) BUMPER CROSS CAR BEAM

(71) Applicant: Kirchhoff Automotive Deutschland GmbH, Attendorn (DE)

(72) Inventors: Patrick Tlauka, Oberhausen (DE); Cristina Matthey, Düsseldorf (DE); Ralf Stegmeyer, Medebach (DE); Rolf Peter Röttger, Mühlheim an der Ruhr (DE); Marco Töller, Cologne (DE); Rolf Schwarzer, Siegen (DE); Stephan Lagin, Attendorn (DE); Maria Schmitt, Attendorn (DE); Lena Kremer, Attendorn (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 244 days.

(21) Appl. No.: 17/425,864

(22) PCT Filed: Jan. 24, 2020

(86) PCT No.: PCT/EP2020/051699
§ 371 (c)(1),
(2) Date: Jul. 26, 2021

(87) PCT Pub. No.: WO2020/156934
PCT Pub. Date: Aug. 6, 2020

(65) Prior Publication Data
US 2022/0024399 A1   Jan. 27, 2022

(30) Foreign Application Priority Data
Jan. 29, 2019   (DE) .................. 10 2019 102 150.2

(51) Int. Cl.
*B60R 19/18*   (2006.01)
*B60R 19/34*   (2006.01)

(52) U.S. Cl.
CPC .............. *B60R 19/18* (2013.01); *B60R 19/34* (2013.01); *B60R 2019/1826* (2013.01)

(58) Field of Classification Search
CPC . B60R 19/18; B60R 19/34; B60R 2019/1826; B60R 19/023; B60R 2019/1813; B60R 19/04
(Continued)

(56) References Cited

U.S. PATENT DOCUMENTS

| 8,950,794 B2 | 2/2015 | Lenkenhoff |
| 9,446,799 B2 | 9/2016 | Franzpötter |

(Continued)

FOREIGN PATENT DOCUMENTS

| DE | 102013100720 A1 | 7/2014 |
| DE | 102015209771 A1 | 12/2016 |

(Continued)

OTHER PUBLICATIONS

Computer translation of KR 2013128260-A (Year: 2013).*
(Continued)

*Primary Examiner* — Amy R Weisberg
*Assistant Examiner* — Melissa Ann Bonifazi
(74) *Attorney, Agent, or Firm* — Polson Intellectual Property Law, PC; Margaret Polson; Christopher Sylvain

(57) ABSTRACT

A bumper crossmember comprising a wave structure oriented in the vertical direction (z direction), wherein the wave structure comprises at least three apex structures which extend in the bumper crossmember longitudinal direction and are adjacent in the vertical direction. This crossmember comprises a first length section that follows its longitudinal extent, at least one second length section that follows its longitudinal extent, and at least one transition section that is arranged respectively between these length sections. In the second length section, the wave structure is inverted with
(Continued)

respect to the first length section, in that the opening direction of the apex structures switches in the transition section. In the transition section, there is at least one additional apex-forming structure, the apex of which is offset in the frontal direction (x direction) with respect to a frontal plane (yz-plane) in which at least two apex structures that are adjacent in the longitudinal sections lie.

16 Claims, 4 Drawing Sheets

(58) Field of Classification Search
USPC .......................................................... 293/133
See application file for complete search history.

(56) References Cited

U.S. PATENT DOCUMENTS

| | | |
|---|---|---|
| 9,598,100 B2 | 3/2017 | Lenkenhoff |
| 9,764,764 B2 | 9/2017 | Irle |
| 10,005,495 B2 | 6/2018 | Töller |
| 10,577,025 B2 | 3/2020 | Michler |
| 10,882,559 B2 | 1/2021 | Gündogan |
| 2015/0375701 A1 | 12/2015 | Röttger |
| 2019/0344385 A1 | 11/2019 | Töller |
| 2020/0231107 A1 | 7/2020 | Günther |
| 2020/0254948 A1 | 8/2020 | Töller |
| 2020/0317149 A1 | 10/2020 | Höning |
| 2020/0398895 A1 | 12/2020 | Günther |
| 2021/0221311 A1 | 7/2021 | Weige |

FOREIGN PATENT DOCUMENTS

| | | | |
|---|---|---|---|
| EP | 2724895 A1 | | 4/2014 |
| JP | WO2015079876 A1 | | 3/2017 |
| KR | 2013128260 A | * | 11/2013 |
| KR | 20130128260 A | | 11/2013 |
| KR | 20180056941 A | | 5/2018 |
| WO | 2008057025 A1 | | 5/2008 |
| WO | 2011123012 A1 | | 10/2011 |

OTHER PUBLICATIONS

International Search Report (ISR) of the International Searching Authority (ISA) dated Apr. 17, 2020 in parent international application PCT/EP2020/051699.

Written Opinion (WO) of the International Searching Authority (ISA) dated Apr. 17, 2020 in parent international application PCT/EP2020/051699.

International Preliminary Report on Patentability (IPRP) Ch II of the International Preliminary Examining Authority (IPEA) dated Aug. 21, 2020 in parent international application PCT/EP2020/051699.

U.S. Appl. No. 17/293,698, filed May 13, 2021 by Kirchhoff Automotive Deutschland GmbH [Per MPEP 609.04(a)].

Office Action dated Apr. 22, 2023 in related Chinese application 202080008460.2.

* cited by examiner

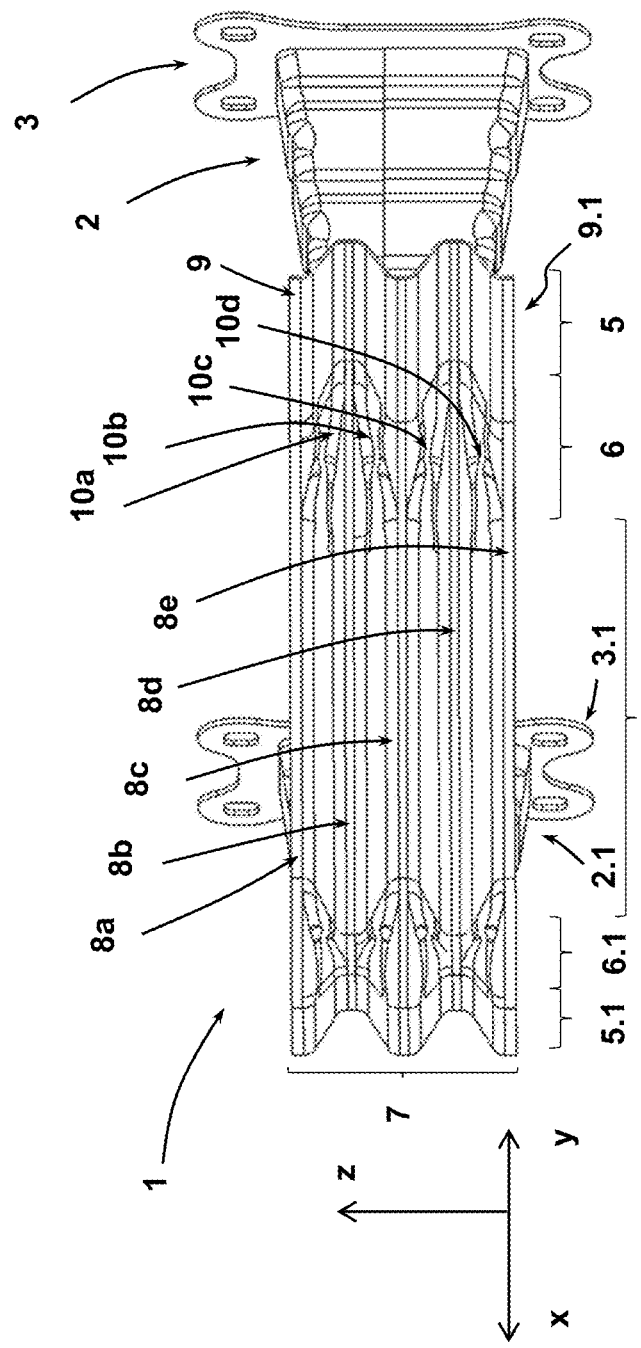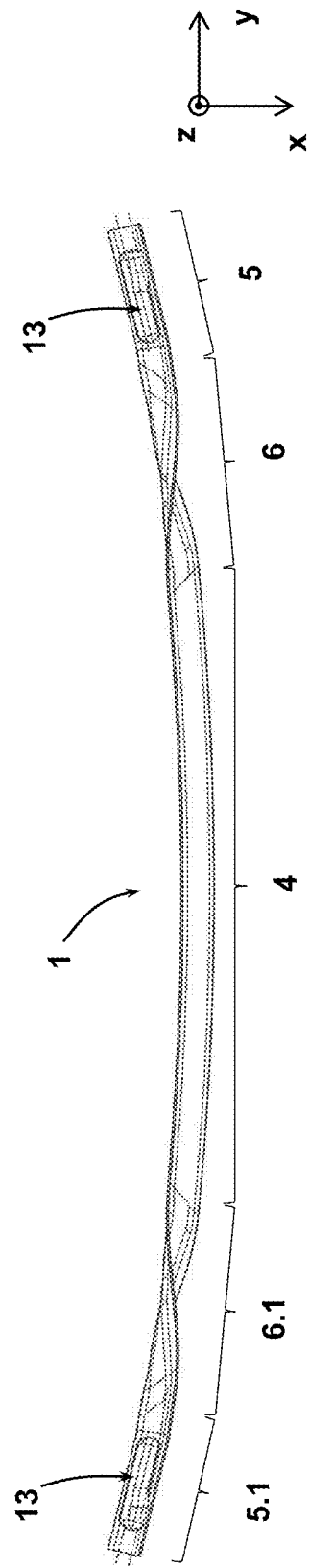

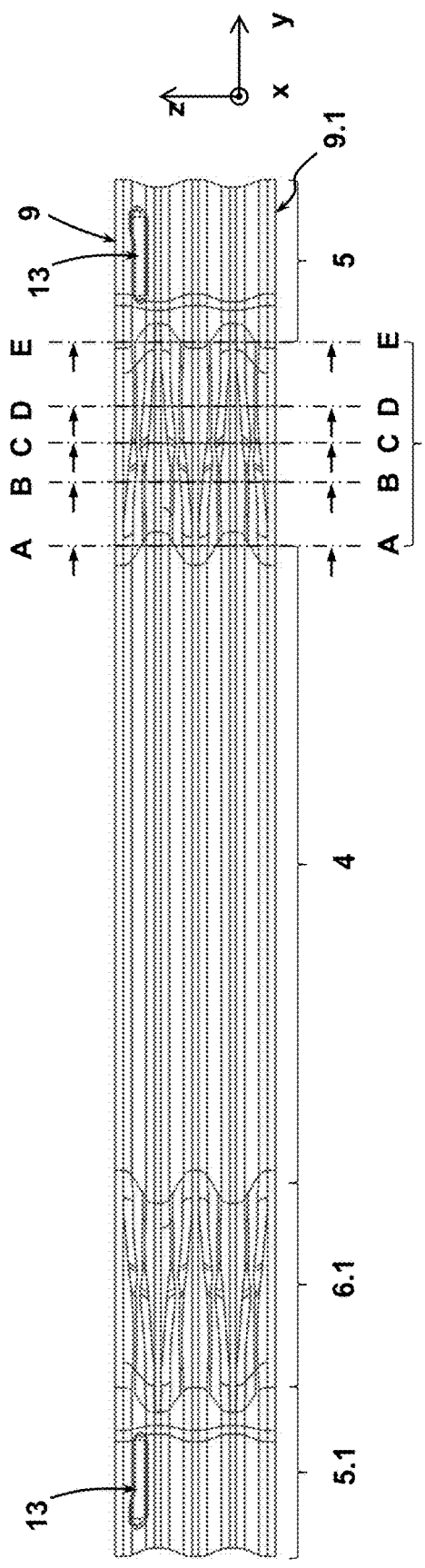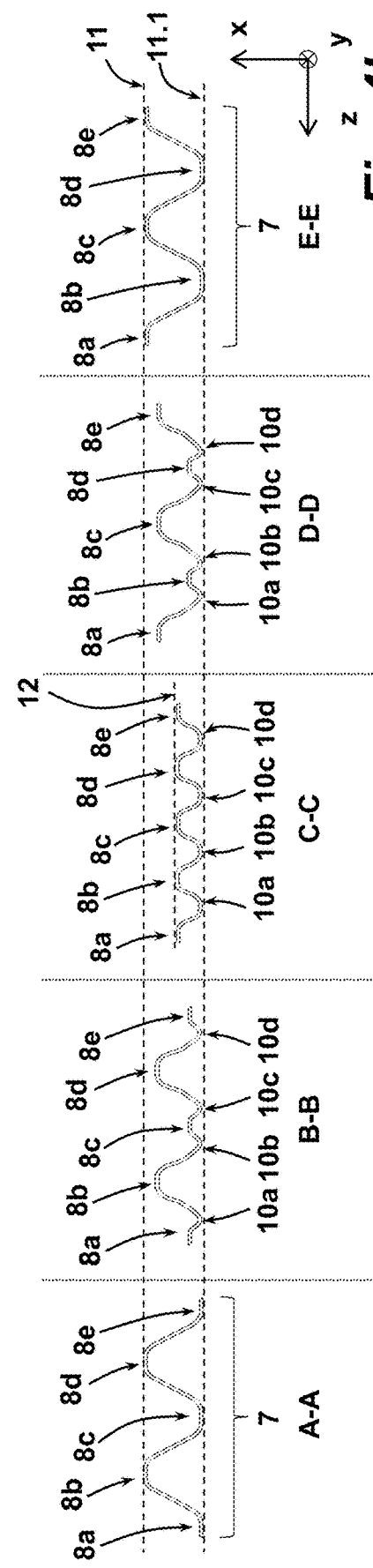

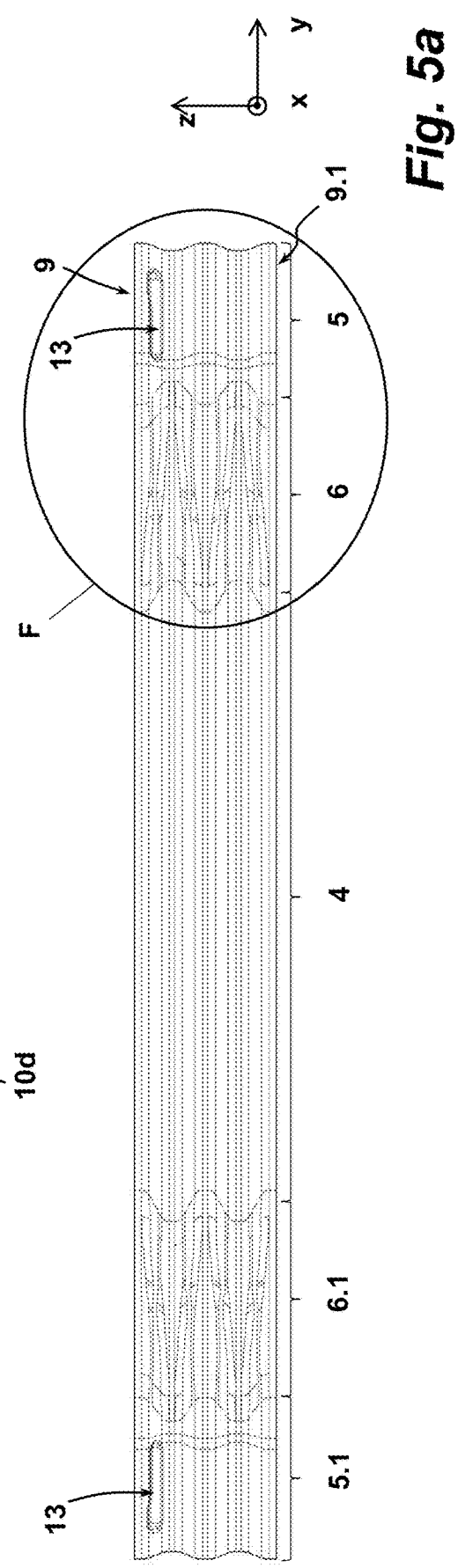
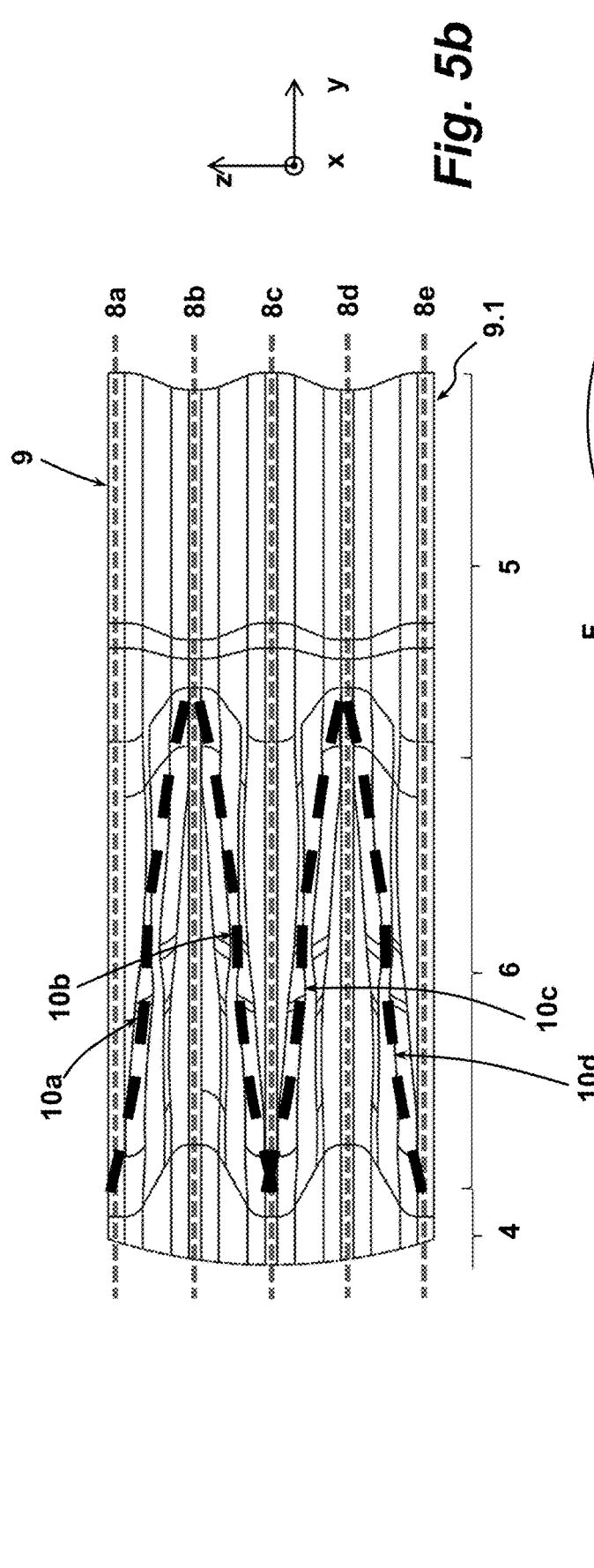

BUMPER CROSS CAR BEAM

BACKGROUND

The present disclosure relates to a bumper crossbeam or crossmember, comprising a wave structure oriented in the vertical direction (z-direction), wherein the wave structure has at least three vertex structures extending in the longitudinal direction of the bumper crossbeam and adjacent in the vertical direction.

A bumper crossbeam is used in a motor vehicle to protect the units behind it as well as the passenger compartment in the event of a head-on collision. The bumper crossbeam extends transversely to the direction of travel (x-direction) of the vehicle and is arranged in front of the units to be protected. The longitudinal extension of the bumper crossbeam follows the y-direction. Typically, the bumper crossbeam is attached at its lateral end to a longitudinal member component of the vehicle, typically connected to a crash box. When forces acting frontally on a motor vehicle are absorbed, the bumper crossbeam is particularly stressed in terms of bending. In order to meet these requirements, bumper crossbeams have stiffening structures.

Furthermore, buckling or tearing of bumper crossbeams can be observed under load. Such bumper crossbeams are often designed with two shells, a first shell profile having a U-shaped profile with the opening of the profile facing in the direction of travel. A strike plate is used to close this opening, so that a box profile is provided in this way. The U-shaped profile represents the stiffening structure. Additional beads introduced in the longitudinal extension of the bumper crossbeam into the striker plate and/or the U-shaped carrier profile can additionally stiffen the bumper crossbeam.

From DE 10 2013 100 720 A1, a one-piece bumper crossbeam is known. In order to achieve the required stability, the crossbeam has a corrugated structure extending in the vertical direction (z-direction) in a central section. The lateral end sections, however, are only profiled in a U-shape. The bumper crossbeam is thus stabilized by embossing which is introduced into the conventional U-shape of such a carrier and which follows the longitudinal extension of the bumper crossbeam thereby forming the wave structure. It is advantageous in such a configuration that no strike plate is provided, which simplifies the production and reduces the overall weight of the bumper crossbeam.

The connection of the bumper crossbeam to a longitudinal member of a motor vehicle component is also important. This connection is useful in the event of a crash as it helps dissipate the energy absorbed by the bumper crossbeam. In a low-speed crash, the bumper crossbeam may only be deformed within narrow limits in order to maintain the protective effect for the assemblies behind it. In a high-speed crash, on the other hand, the connection area is exposed to increased loads and can tear in extreme cases. It must therefore be ensured that the bumper cross member does not kink in or adjacent to the connection area. It is also required that a bumper crossbeam has sufficient robustness against torsional loads, which proves to be difficult with open shell profiles. This works better to a sufficient extent if this is made of sheet steel, with at least two-shell structures laid on the bumper crossbeam to form a box profile.

SUMMARY

Proceeding from this background, an aspect of the present disclosure is to propose not only a weight and cost-optimized bumper crossbeam, but also one that is resistant to torsional loads, has the lowest possible number of components and a good connection for a longitudinal member component, such as a crash box, in terms of force transmission.

This is achieved by a crossbeam of the type mentioned at the beginning, wherein the bumper crossbeam has a first longitudinal or length section following its longitudinal extension and at least one second longitudinal or length section following its longitudinal extension, as well as a respective transition section arranged between these longitudinal sections in each case, and wherein the wave structure in the second length section is inverted compared to the first length section, in that the opening direction of the vertex structures changes in the transition section, and wherein at least one additional vertex-forming structure is present in the transition section, and wherein a vertex of the vertex-forming structure is opposite a front plane (yz plane) in which at least two adjacent vertex structures lie in the length sections, and is offset in the front direction (x direction).

In the context of this discussion, the typical coordinate system for a motor vehicle is used for the directional information. The extension of the bumper crossbeam in the direction of driving corresponds to the x-direction. The extension of the bumper crossbeam in the direction of the width of the vehicle corresponds to the y-direction. The vertical or upward direction corresponds to the z-direction.

This bumper crossbeam comprises a wave structure oriented in the upward direction. The wave structure thus extends in the z-direction through positive and negative structures formed adjacently in each case. This results in a series of at least one wave crest and at least one wave trough transversely to the longitudinal extent of the bumper crossbeam. Such a wave crest or a wave trough is generally referred to as a vertex or apex structure. Such an apex structure is also to be understood to include a structure that forms a wave crest or a wave trough and thus a positive structure or a negative structure which has an additional structuring, such as, for example, a bead embossed therein that follows the longitudinal extent of the bumper crossmember at least in some areas. It is also possible to introduce embossments and/or beads in the intermediate areas between a wave crest and a wave valley. According to a further development, for example, this may be the case in the area of the second length sections for creating connection structures for a crash box. A wave structure is preferably a sequence of opposing curvatures, therefore of curved structures, that merge smoothly (continuously, in particular with a constant tangent or constant curvature) into each other. A wave structure is also to be understood to include such a structure in which the legs are beveled with respect to the apex areas and thus the apex structures have surfaces oriented orthogonally to the direction of driving (x-direction).

It is provided that the bumper crossbeam comprises at least three apex structures which are adjacent in the z-direction, each opposite with respect to their opening direction, which extend in the longitudinal direction of the bumper crossbeam (y-direction). Adjacent vertex structures typically run parallel to one another following the y-direction.

The bumper crossbeam comprises a first and at least one second length section following its longitudinal extent. In these length sections, the vertex structures are directly adjacent in the vertical direction and form the wave structure already mentioned. The difference between the first and the second length section is that in the second length section this wave structure is inverted with respect to the opening direction of its apex structures compared to the first length section. If an apex structure is, for example, a mountain structure (positive structure) in the first length section, then this apex structure is a valley structure (negative structure) in the second length section. This inversion of a positive structure into a negative structure and vice versa along the same apex line takes place in a transition section arranged between the two length sections and extending in the y-direction.

So that two vertex structures that are adjacent in the longitudinal or length sections with respect to the z-direction, that is a mountain structure (positive structure) and a valley structure (negative structure), can change their opening direction, the vertex lines must be at one point, viewed in an xz section, on a common yz plane. In a projected xy sectional view, the two vertex lines therefore intersect, that is, the vertex lines projected onto a common xy plane intersect. This means that, due to the change in the opening direction of the apex structures, two apex structures adjacent in the length section are at one point during their course from mountain to valley or from valley to mountain at the same height in the x-direction. At this point, however, it is also possible that the heights in the x-direction are designed differently.

In the transition section, an additional vertex-forming structure is provided between two adjacent apex structures. This additional vertex-forming structure does not necessarily have to form a vertex in the narrower sense. Rather, this term should also be understood to mean a structure that is L-shaped or S-shaped in cross section (xz plane). This additional vertex structure is offset in the x-direction to the yz plane in which the two vertex structures lie adjacent in the longitudinal sections. By arranging the vertices of the additional vertex-forming structures offset with respect to the x-direction relative to the yz plane, in which the vertex structures adjacent in the longitudinal sections lie at one point in the transition area, this area is stabilized with regard to its bending strength. A simple buckling is thus effectively prevented in this section of the bumper crossbeam in the x-direction.

There is also the possibility that the transition area in its x-direction has a lower height in its wave structure, therefore a lower amplitude, than the length sections in the x-direction. In this way, a predetermined bending point can be defined. If the bumper crossbeam cannot withstand extreme loads, it will bend at this specified predetermined bending point. This results in a central bending of the crossbeam while at the same time making better contact with a barrier.

In the longitudinal extension of the transition sections of the bumper crossbeam, there is therefore no point with a cross section in the xz plane that is not characterized by at least one vertex structure. The number of the sum of vertex structures and vertex-forming structures, and thus those structures which are responsible for the wave structure in the transition section, is increased compared to the number in the adjacent first and second length sections. In the case of a bumper crossbeam with a wave contour pointing in the direction of driving in the first length section having two positive and three negative vertex structures (five vertex lines), at least six vertex lines are located in the transition area in a cross-sectional profile and thus a correspondingly larger number of vertex structures or vertex-forming structures. This relates that the reduction in the amplitude of the wave structures (amplitude in x-direction) in the transition section is compensated by a higher number of structures.

The additional vertex-forming structures, like the vertex structures of the adjacent length sections, can equally have additional stamping or embossment structures to stabilize them.

In a preferred embodiment, at least one additional vertex-forming structure is introduced between two vertex structures that are adjacent in the longitudinal sections. In such a case, this additional vertex-forming structure is typically a U-shaped or V-shaped structure provided with legs and molded onto the adjacent vertex structures.

In a further development of this embodiment, the apex of the additional vertex-forming structure is provided between two vertex structures that are inverted with respect to their opening direction in the transition section. The additional vertex-forming structure is attached to a first vertex structure of the wave structure provided in the longitudinal sections at the transition from the first longitudinal section to the transition section. The additional vertex-forming structure is attached to a second vertex structure of the wave structure, which is adjacent to the first vertex structure in the longitudinal sections, at the transition from the transition section to the second longitudinal section. The opening direction of this vertex of the additional vertex-forming structure does not change, and consequently points continuously against or in the direction of travel (x direction) over its extension in the y-direction. In such an example embodiment, the vertex of the additional vertex-forming structure extends from a first vertex structure located between two vertex structures in the first longitudinal section—the two vertex structures pointing in a first (positive) direction and the first vertex structure pointing in a second (negative) direction opposite to the first direction in the first longitudinal section—to a vertex structure which changes its pointing direction from the first (positive) direction in the first longitudinal section to the inverse direction (second (negative) direction) in the second longitudinal section. The additional vertex-forming structure therefore changes its track or lane in the transition section between two vertex lines that are adjacent to one another in the adjacent length sections in the z-direction. This lane change preferably runs in the direction of the longitudinal extent of the bumper crossbeam along a largely S-shaped curved path. There is also the possibility that the additional vertex-forming structure does not remain in a yz plane, but rather is designed as a saddle.

In one embodiment of such a bumper crossbeam, the additional vertex-forming structures in the transition between the transition area and the length section border on a common line running in the z-direction. The transition area begins at each apex structure of the wave structure of the bumper crossbeam in a common xz plane and/or ends in a further common xz plane. This design provides a uniform structure that has a positive effect on the flow of force along the bumper crossbeam. However, it is also possible that the transition area extends differently with respect to different apex structures.

In a further embodiment, the second longitudinal section has at least one connection point for connecting the bumper crossbeam to a longitudinal member component of a motor vehicle, for example a crash box as the longitudinal member component. In this way it is possible to design the two length sections so that the bumper crossbeam is designed in the first length section for a high force absorption and in the second length section for a correspondingly high force output. By inverting the apex structures, the force absorption structure corresponds to the force output structure. Thus, in principle, there is no need for any additional measures to be undertaken to compensate for the structures pointing in the direction of force absorption and structures pointing in the force output, as is necessary in the prior art.

Another advantage of the concept described above is that the wave structure in the first length section has a greater amplitude than in the ends of second length segment. This also applies vice versa. In this way, the crash performance can be influenced.

In addition, inverting the wave structure of the bumper crossbeam achieves a high flexural rigidity in the first length section, while the second length section can be designed for effective energy absorption in the event of an impact. Due to the fact that the corrugated profile of the bumper crossbeam in the second length section is designed in such a way that the edges pointing in the z direction absorb force when a force is introduced in the x direction, in the event of a crash, the crash boxes can absorb the energy introduced immediately after contact with the barrier without the crossbeam structure having to be significantly deformed beforehand at a lower force level.

It was surprising to find that, despite the inversion of the apex structures between the first and the second length sections, the transition area does not represent any weakening with regards to the bending and torsional stresses on the bumper crossbeam, but by means of the measures described, a bumper crossbeam could be provided that withstands higher loads not only in terms of its weight but also in terms of its bending and torsional strength compared to conventional, in particular one-piece, bumper crossbeams.

With respect to the flow of forces, it is also advantageous in the event of a crash if the bumper crossbeam has an odd number of vertex structures, and also two vertex structures positive in the x direction are provided in the first length section. These two positive vertex structures are bounded for the upper and lower ends of the bumper crossbeam by the apex line of an adjacent negative apex structure. Thus, in this length section, the upper and lower end of the bumper crossbeam is arranged set back from its front end, which points in the direction of travel in the direction of the vehicle.

Correspondingly, the wave structure is formed in the two second length sections in reverse. In general, it is considered to be expedient if the bumper crossbeam is delimited in the first longitudinal section and the two second longitudinal sections in the region of a vertex line of a vertex structure.

The bumper crossbeam is typically made from a steel blank by press hardening. The bumper crossbeam is preferably one piece, but can be fully or partially fitted with a strike plate at the front or rear, for example, if desired to further increase rigidity overall or locally.

In a preferred embodiment, the bumper crossbeam has more apex structures open in the direction of driving in the first longitudinal section than in the second longitudinal section.

In its longitudinal extension, the bumper crossbeam preferably has a first longitudinal section in the middle and two transition sections adjoining it on either side in each case, as well as two second longitudinal sections adjoining the transition sections.

In one embodiment of such a bumper crossbeam, the second length sections are designed so that they have two positive apex structures that point against the direction of travel and thus towards the vehicle. The longitudinal member component, for example a crash box in each case, is attached thereto. In the first length section located between these two second length sections, it also has two positive apex structures, however, pointing in the direction of travel.

The extension of a transition section in the y-direction is sufficiently long in order to have an inversion of the vertex structures that is not too abrupt. This favors a transmission of forces from the first length section into the second length section or sections. In the case of a bumper crossbeam with two second length sections and a middle first length section, the length of such a transition section is, for example, about 30 to 35% of the length of the first length section.

In a further preferred embodiment, the developed length in the upward direction of the bumper crossbeam is smaller in the transition area than in the length sections. Surprisingly, it has been shown that, although less material is thus needed in the transition section than in the adjacent length sections, the bumper crossbeam also withstands the requirements of a crash test in its transition areas. This also has a positive effect on the lowest possible weight of the bumper crossbeam.

The minimum radius of the bulges in the wave structures is preferably 5 mm. This ensures that there is a continuous transition so that a notch effect is avoided.

BRIEF DESCRIPTION OF THE DRAWINGS

The following description is provided with reference to the appended drawings using an example embodiment, wherein:

FIG. 2 shows the representation of FIG. 1 as a line drawing, FIG. 3 shows a plan view of the bumper crossbeam of FIG. 2 on the xy plane, FIG. 4a shows a front view of the bumper crossbeam of FIG. 2 (view on the yz plane), FIG. 4b shows sectional views of the bumper crossbeam of FIG. 4a along the section lines A-A to E-E as indicated therein, FIG. 5a shows the bumper crossbeam of FIG. 4a with a detail section F indicated for of one of its two transition sections with an adjoining length section.

FIG. 5b shows an enlarged view of the detail section F of FIG. 5a.

DETAILED DESCRIPTION

Figure 1:
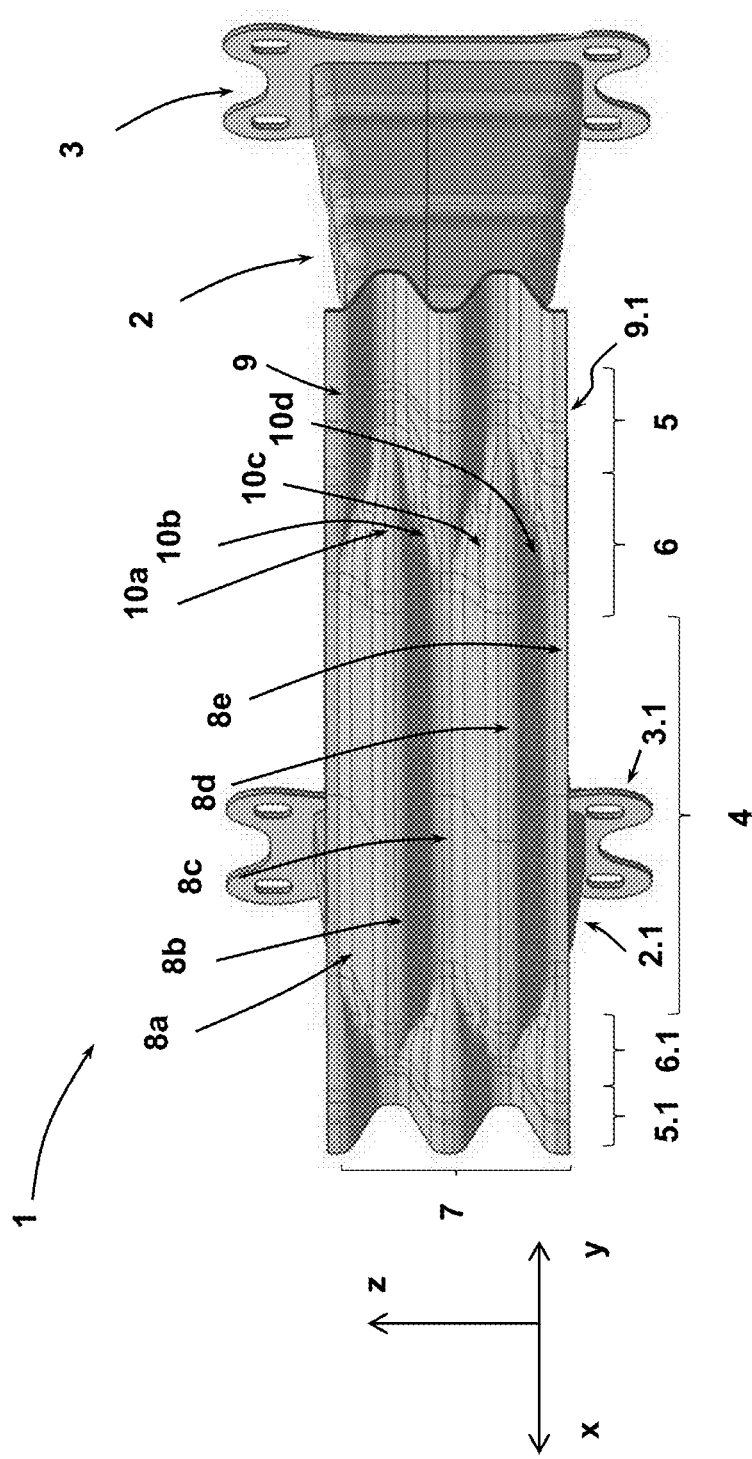
FIG. 1 shows a perspective view of a bumper crossbeam according to the present disclosure with crash boxes connected to it.

The following statements apply equally to FIGS. 1 and 2. In FIG. 1, the bumper crossbeam 1 is shown in gray shading, since it is able to reproduce its structure better than the line drawing in FIG. 2. The bumper crossbeam 1 is produced from a steel plate by press hardening and is connected with its two outer length sections to a crash box 2, 2.1, which in turn comprises of a base plate 3, 3.1. The bumper crossbeam 1 comprises a first length section 4 arranged in the central area of the bumper crossbeam 1, two second length sections 5, 5.1 on which the crash boxes 2, 2.1 are connected, as well as a respective transition section 6, 6.1 lying between the first length section 4 and each second length section 5 or 5.1.

In the first and the second length sections 4, 5, 5.1 the bumper crossbeam 1 has a wave structure 7 aligned with its structuring in the z-direction. In this example embodiment, this wave structure 7 is formed by five vertex structures 8a-e which merge into one another and are respectively adjacent in the length sections 4, 5, 5.1. The first length section 4 differs from the second length sections 5, 5.1 in that the apex structures 8a-e of the first length section 4 are each inverted in the two second length sections 5, 5.1. This means that the opening direction of the apex structures 8a-e has changed from the first length section 4 to the second length section 5, 5.1. The apex structure 8b in the first length section 4 has an opening opposite to the direction of driving (−x direction), and in the second length section 5, 5.1 it opens in the direction of driving (+x direction).

The crash boxes 2, 2.1 are connected in the second length sections 5, 5.1 to the inverted, closed apex structures 8b, 8d which point in the direction of travel in the first length section 4, which apex structures 8b, 8d in the second length sections 5, 5.1 are open in the direction of travel and thus closed in the direction of the crash boxes 2, 2.1 with their apex structures. These vertex structures are spaced apart in the length sections 4, 5, 5.1 from the outer edge 9, 9.1 of the bumper crossbeam 1 in the z-direction. The crash boxes 2, 2.1 are connected to those positive vertex structures, which in the first length section are designed as positive vertex structures pointing in the direction of travel. A force dissipation from an impact point in the first length section 4 into at least one of the two crash boxes 2, 2.1 benefits from this design.

The change in the opening direction along the longitudinal extension (y-direction) of the bumper crossbeam 1 with respect to the apex structures 8a-e takes place at the transition sections 6, 6.1 between the first and the two second length sections 5, 5.1. In the transition sections 6, 6.1, the apex line of each apex structure 8a-e is continuously changed from the first length section 4 in terms of its height in the x direction until the inverted apex structure is reached. In a section of such a vertex line in the yz plane, the inversion takes place in an elongated S-shaped curved formation of the apex line.

In the transition areas 6, 6.1, additional vertex-forming structures are provided between vertex structures 8a-e that are adjacent in the length sections 4, 5, 5.1. These vertex-forming structures each have a vertex 10a-d. These retain their opening direction along the transition section 6, 6.1. The additional vertex-forming structures do not run parallel to the vertex structures 8a-e of the wave structure 7 in the first length section 4 and the two second length sections 5, 5.1, but rather connect with their apices 10a-d adjacent apex structures 8a-e or two adjacent apex lines in each case.

FIG. 3 shows a plan view of the bumper crossbeam 1 from FIGS. 1 and 2. The first longitudinal section 4 can be seen, arranged in the middle of the bumper crossbeam 1 in the y-direction, which is followed by the transition section 6, 6.1 on both sides. The second length sections 5, 5.1 then adjoin the transition sections 6, 6.1. The bumper crossbeam 1 is slightly curved in its xy plane, in order to follow the typical shape of a motor vehicle front. In the transitional sections 6, 6.1 it can be clearly seen that due to the arrangement of the apex structures 8a-e in the y-direction, a wave structure is present at every point in an xz-plane.

FIG. 4a shows the bumper crossbeam 1 in a front view. Identified herein are five section planes AA, BB, CC, DD, EE, the corresponding sectional views being shown next to one another in FIG. 4b. The section planes are each in the xz plane. The respective planes represent a passage through the transition section 6 starting from the first length section 4 towards the second length section 5 along the longitudinal extent of the bumper crossbeam 1 and thus in its y-direction. The lines 11, 11.1 shown in dashed lines in FIG. 4b each represent the maximum deflection or amplitude of the wave structure 7. The introduction of one or more embossments 13 and/or beads in the intermediate areas between a wave crest and a wave trough, each in the area of the second length sections 5, 5.1 enables the creation of connection structures for a crash box. These are not shown in FIGS. 1 and 2.

Reference is made to the sections shown in FIG. 4b, made in the transition section 6, whereby the corresponding statements also apply to the other transition section 6.1. The section AA is located at the end of the first longitudinal section 4 to the transition section 6. The vertex structures 8a-e of the wave structure 7 adjacent to the first length section 4 in the z-direction are clearly seen. These differ in their opening direction opposite to or in the direction of travel (x-direction). In this example embodiment, the apex structures 8a-e are arched and continuously molded onto one another. The transition section 6 begins in this common plane A-A for all adjacent vertex structures 8a-e in the length sections 4, 5, 5.1.

In the transition section 6 there are additional vertex-forming structures between the vertex structures 8a-e which are adjacent in the longitudinal section 4. In this example embodiment, these four additional vertex-forming structures each include a vertex 10a-d. The vertices 10a-d of the vertex-forming structures are molded onto the vertex structures 8a-e of the length sections 4, 5. In this example embodiment, the vertex-forming structures are approximately U-shaped.

In the section CC, which is arranged in the middle of the transition section 6 in its y-direction, all vertex structures 8a-e, which are adjacent in the length sections 4, 5, lie in a yz-plane (indicated by a line 12). Here all vertex structures 8a-e have the same x value. The vertex-forming structures are arranged between these vertex structures 8a-e. Their vertices 10a-d are always offset from the yz plane 12 just mentioned, in which the vertex structures 8a-e lie in section CC. The number of vertices 8a-e, 10a-d participating in the wave structure in the transition section 6 is therefore greater than in the adjacent length sections 4, 5. This applies to the entire transition section 6.

In section DD, the structures 8a, 8c, 8e, which are lower in section AA, are now higher than the structures 8b, 8d, which are higher in section AA, until the wave structure 7 is completely inverted in section EE. The transition section 6 has ended at this position. In the second length section 5, without the interposition of additional vertex-forming structures, the vertex structures 8a-e which are adjacent in the first length section 4 are again adjacent to one another.

FIG. 5 shows an enlarged illustration of the transition area 6 of the bumper crossbeam 1 in a front view according to FIG. 4a. It can be clearly seen that the vertices 10a-d of the vertex-forming structures are each molded onto a first vertex structure 8a, 8c, 8e at the transition between the first longitudinal section 4 and the transition section 6, and are molded onto a different vertex structure 8b, 8d at the transition from transition section 6 to second longitudinal section 5, which is adjacent to the first vertex structure 8a, 8c, 8e in one of the longitudinal sections 4, 5. The course of the vertices 10a-d of the vertex-forming structures does not run parallel to the vertex lines of the vertex structures 8a-e.

The invention has been described on the basis of an example embodiment. Without departing from the scope of the applicable claims, the skilled person will find numerous other embodiments, modifications and configurations to implement the concept of the invention, without these having to be discussed or shown in further detail in the context of this disclosure.

LIST OF REFERENCES

1 Bumper crossbeam
2, 2.1 Crashbox 3, 3.1 Baseplate
4 First length section
5, 5.1 Second length section
6, 6.1 Transitional section
7 Wave structure
8a-e Vertex structure
9, 9.1 Edge
10a-d Vertex of the vertex-forming structure
11, 11.1 Lines that represent the maximum amplitude of the wave structure
12 Line representing the trace of the yz plane
13 Embossments

The invention claimed is:

1. A bumper crossbeam, comprising:
a wave structure aligned in a vertical direction (z-direction), the wave structure comprising at least three vertex structures that extend in a longitudinal direction (y-direction) of the bumper crossbeam and are adjacent in the z-direction,
the bumper crossbeam having a first longitudinal section following its longitudinal extent and at least one second longitudinal section following its longitudinal extent, as well as at least one transition section arranged respectively between the first and second longitudinal sections,
wherein the wave structure in the second longitudinal section is inverted compared to the first longitudinal section in that the opening direction of the vertex structures changes in the transition section, and
wherein at least one additional vertex-forming structure is provided in the transition section, and a vertex of the additional vertex-forming structure is offset in a front direction (x-direction) with respect to a front plane (y-z plane) in which at least two vertex structures that are adjacent in the first and second longitudinal sections lie in the transition section.

2. The bumper crossbeam of claim 1, wherein the at least one additional vertex-forming structure is arranged between two vertex structures which are adjacent in the first and second longitudinal sections.

3. The bumper crossbeam of claim 1, wherein the vertex structures of the wave structure are arched in the first and second longitudinal sections.

4. The bumper crossbeam of claim 3, wherein a radius of curvature of the vertex structures is at least 5 mm.

5. The bumper crossbeam of claim 1, wherein the vertex of the at least one additional vertex-forming structure is arched.

6. The bumper crossbeam of claim 5, wherein a radius of curvature of the at least one additional vertex-forming structure is at least 5 mm.

7. The bumper crossbeam of claim 1, wherein the vertex of the at least one additional vertex-forming structure is molded onto a first vertex structure of the wave structure at a transition from the first longitudinal section to the transition section, and is molded onto a second vertex structure of the wave structure at a transition from the transitional section to the second longitudinal section, wherein the second vertex structure is adjacent to the first apex structure in the first and second longitudinal sections.

8. The bumper crossbeam of claim 1, wherein at least one vertex structure in the first and/or second longitudinal sections has at least one additional embossing extending in the longitudinal direction of the bumper crossbeam.

9. The bumper crossbeam of claim 1, wherein the transition section has multiple additional vertex-forming structures, and the additional vertex-forming structures border the first and/or second longitudinal section on a joint line extending in the z-direction.

10. The bumper crossbeam of claim 1, wherein at least one connection point for connecting the bumper crossbeam to a longitudinal member component is located in the second longitudinal section.

11. The bumper crossbeam of claim 10, wherein the bumper crossbeam in the first longitudinal section has more vertex structures which are open in the direction of travel than in the second longitudinal section.

12. The bumper crossbeam of claim 10, wherein the at least one connection point for connecting the bumper crossbeam is arranged on at least one vertex structure in the second longitudinal section which is spaced apart from an edge of the second longitudinal section pointing in the z-direction.

13. The bumper crossbeam of claim 1, wherein a width extension in the vertical direction (z-direction) of the bumper crossbeam in the transition area is smaller than in the first and second longitudinal sections adjacent thereto.

14. The bumper crossbeam of claim 1, wherein the bumper crossbeam has the first longitudinal section in a center portion of its longitudinal extension, as well as two transitional sections and two second longitudinal sections, with a first transitional section adjoining the first longitudinal section on one side and a second transitional section adjoining the first longitudinal section on another side, and with one second longitudinal section adjoining the first transitional section and another second longitudinal section adjoining the second transitional section.

15. The bumper crossbeam of claim 1, wherein the bumper crossbeam is made from a steel plate by press hardening.

16. The bumper crossbeam of claim 1, wherein one or more embossments and/or beadings are formed in an intermediate area located between a wave crest and a wave trough in the at least one second longitudinal section to provide connection structures for a crash box.

* * * * *